United States Patent [19]
Tanaka

[11] 3,860,587
[45] Jan. 14, 1975

[54] METHINE COMPOUNDS

[75] Inventor: Toshiki Tanaka, Wakayama, Japan

[73] Assignee: Nippon Chemical Works Co., Ltd., Wakayama-ken, Japan

[22] Filed: July 28, 1972

[21] Appl. No.: 276,263

[52] U.S. Cl... 260/240.1, 117/33.5 T, 252/301.2 R, 260/240.8
[51] Int. Cl............................................ C07d 55/04
[58] Field of Search....................... 260/240.1, 240.8

[56] References Cited
UNITED STATES PATENTS
2,312,153  2/1943  Dieterle ................................... 95/7
3,311,619  3/1967  Fisher et al. ...................... 260/240.8

*Primary Examiner*—G. Thomas Todd
*Attorney, Agent, or Firm*—Eric H. Waters

[57] ABSTRACT

Methine compounds useful as fluorescent dyes and pigments are obtained by condensing a 2-phenylbenzazole having at least one amino radical in the benzene group with a 2-methyleneindoline -ω- aldehyde.

13 Claims, No Drawings

METHINE COMPOUNDS

This invention relates to novel methine compounds and to processes for production and application thereof.

The novel methine compounds of the present invention can be represented by the general formula,

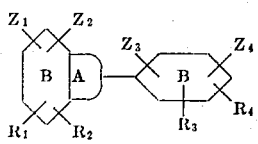

wherein B is a benzene group; A is an oxazole, thiazole, imidazole, triazole or the like azole ring fused to the adjacent benzene nucleus and may have a substituent, if necessary; $R_1$, $R_2$, $R_3$ and $R_4$, which may be same or different, are individually a hydrogen or halogen atom, a substituted or unsubstituted aryl, alkyl, aralkyl or alkoxy group, or a cyano or substituted or unsubstituted amino radical; and either one or two of $Z_1$, $Z_2$, $Z_3$ and $Z_4$ are indole derivatives of the general formula,

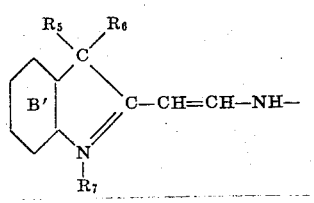

wherein B' is a substituted or unsubstituted benzene group; $R_5$ and $R_6$, which may be same or different, are individually an alkyl group; and $R_7$ is an alkyl or substituted alkyl group.

The novel methine compounds of the present invention are particularly valuable as colorants such as pigments and dyes, and can be easily produced in high yields by condensing a 2-phenylbenzazole having at least one amino radical in the benzene group with a 2-methyleneindoline-ω-aldehyde. The novel compounds thus produced are particularly strong in fluorescence, have the ability of imparting markedly brilliant yellow color tones to natural, artificial and synthetic materials, can give dyed products extremely high in fastness particularly to heat and light, and far more prominent in utility than the conventional basic dyes and dye bases corresponding thereto. Accordingly, the novel compounds of the present invention are particularly useful as colorants when viewed from the industrial standpoint.

The present invention will be explained in further detail.

In the first place, the process of the present invention is explained below.

The present process can be easily accomplished by subjecting a starting 2-phenylbenzazole and one or two equivalents of a starting 2-methyleneindoline-ω-aldehyde to condensation reaction in a mineral or organic acid at normal or elevated temperature. Examples of the starting 2-phenylbenzazole include 2-(p-aminophenyl)-5-diethylaminobenzoxazole, 2-(m-aminophenyl)-5-dimethylaminobenzoxazole, 2-(p-aminophenyl)-5,6-dimethylbenzoxazole, 2-(p-aminophenyl)-5-methylbenzothiazole, 2-(p-aminophenyl)-5-methyl-6-aminobenzo-thiazole, 2-(p-aminophenyl)-3,5-dimethylbenzimidazole, 2-(m-aminophenyl)-benzimidazole, 2-(p-aminophenyl)-5-methoxybenzotriazole, 2-(m-aminophenyl)-6-aminobenzotriazole, 2-(m-amino-p-methoxyphenyl)-6-aminobenzotriazole, 2-(p-aminophenyl)-5-chloro-6-aminobenzotriazole, 2-(p-aminophenyl)-5-methyl-6-aminobenzotriazole, 2-(p-amino-m-chlorophenyl)-5-phenyl-6-aminobenzotriazole and 2-(m-amino-p-cyanophenyl)-6-aminobenzotriazole, and examples of the starting 2-methyleneindoline-ω-aldehyde include 1,3,3-trimethyl-2-methyleneindoline-ω-aldehyde, 1-cyanoethyl-3,3-dimethyl-2-methyleneindoline-ω-aldehyde, 1-ethyl-3,3-dimethyl-2-methyleneindoline-ω-aldehyde, 1,3,3-triethyl-2-methyleneindoline-ω-aldehyde and 1,3,3-trimethyl-5-ethylcarbonyl-2-methyleneindoline-ω-aldehyde, though these are not limitative.

The mineral acid used in the reaction is desirably hydrochloric or sulfuric acid, and the reaction is ordinarily effected in a 5 to 20 wt percent aqueous solution, and the organic acid which may be used in place of the inorganic acid is preferably formic or acetic acid. If necessary, the organic acid may be used in admixture with water or the mineral acid. Further, a mixture of two or more compounds corresponding to the above-mentioned starting materials may be subjected to condensation reaction, whereby an optional mixed compound can be obtained according to the aforesaid process. The reaction temperature is ordinarily in the range from 10° to 40°C., and the reaction time is ordinarily in the range from 4 to 8 hours, but these are not limitative and may be controlled optionally. While the essential conditions necessary for practicing the present process are as described in the above, it would be needless to explain, in view of the ordinary chemical knowledge, that the product obtained according to the present process may, of course, be in the form of a basic salt or a zinc chloride double salt thereof, or a free base capable of being isolated therefrom according to a known procedure.

In the next place, processes for application of the novel compounds according to the present invention are explained in detail below.

The compounds of the aforesaid general formula have characteristics as basic dyes and dye bases which are free bases thereof, and hence can be applied as basic dyes, either as they are or by adoption of various procedures, to a variety of materials. For example, not only the present compounds in the form of basic dyes can be used, as they are, for the dyeing of cellulose, acrylonitrile, silk, wool and the like fibers, but also the present compounds in the form of dye bases or pigment-processing dyes can be applied to all such materials as polyamide, polystyrene, polyurethane, polyvinyl chloride, polyvinyl acetal, phenol and the like synthetic resins; leather, wood, paper, pulp and the like natural and artificial materials; and nitrocellulose, acetyl cellulose, ethyl cellulose and the like cellulosic materials, whereby brilliant yellow color tones having strong fluorescence characteristics are imparted to the materials. Further, the above-mentioned dyes or dye bases used in the present processes have such characteristic color tones as mentioned above and hence can advantageously be used in combination with other colorants and the like. Due to their specific properties, the dye bases according to the present invention can be used in any forms including water-soluble forms, e.g. in the form of solutions in water or organic solvents, in the form of solids or pastes, and in the form of dispersions. The color tones of materials dyed according to the processes of the present invention are yellow to orange colors. When the dyes of the present invention are used in combination with other colorants, however, various color tones having fluorescence characteristics can be imparted to the above-mentioned materials. Thus the compounds of the present invention are particularly valuable from the industrial standpoint.

The present invention is illustrated in more detail below with reference to examples, in which all parts and percent are by weight.

EXAMPLE 1

21.5 Parts of 1-ethyl-3,3-dimethyl-2-methyleneindoline-ω-aldehyde and 28.1 parts of 2-(p-aminophenyl)-5-diethylaminobenzoxazole are added to 500 parts of 1 percent hydrochloric acid, and the resulting mixture is stirred at 20° to 30°C. for about 6 hours to deposit orange color crystals. The deposited crystals are recovered by filtration, sufficiently washed with a 5 percent aqueous sodium chloride solution and then dried to obtain 47.0 parts of a dye powder having the following formula:

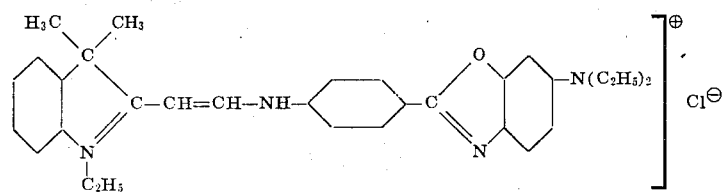

2-[{ p-(6-diethylamino-benzoxazolyl-(2))-anilino}--ethylenyl]-1-ethyl-3,3-dimethylindoline.

Using the thus obtained dye powder, an Orlon cloth (made of polyacrylonitrile) is dyed according to an ordinary procedure under the conditions of a concentration of 1 percent, a bath ratio of 1:50, a temperature of 95° to 100°C. and a time of 40 minutes to obtain a dyed product having a brilliant pale yellowish orange color with a strong fluorescence. This dyed product shows such excellent characteristics as a light fastness of 7th grade (JIS, L-1044, xenone lamp) and a washing fastness of 5th grade (JIS, L-1045, MC—3).

Procedures identical with or similar to those mentioned above can be applied also to nylon, acetate, silk, wool, cotton and the like fibers, and to polyethylene, polystyrene and the like films and sheets to obtain dyed products having substantially the same characteristics as above.

In the case of the dyeing process as mentioned above, various additives may, of course, be added as occasion demands.

EXAMPLE 2

40.2 Parts of 1,3,3-trimethyl-2-methyleneindoline-ω-aldehyde and 22.5 parts of 2-(m-aminophenyl)-5-aminobenzotriazole are dissolved in 600 parts of 6 percent acetic acid, and the resulting solution is stirred at 50°C. for about 5 hours to obtain a deep brown color solution. This solution shows no change at all even when it is tightly closed in a vessel and allowed to stand in the dark at −10° to 0°C. or at 40° to 45°C. for 3 months. The said solution contains 58.0 parts of a dye having the following formula:

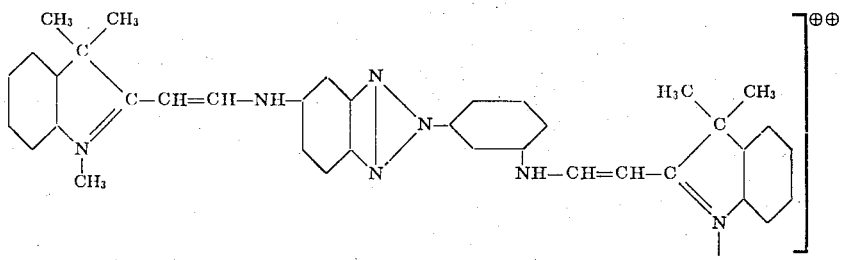
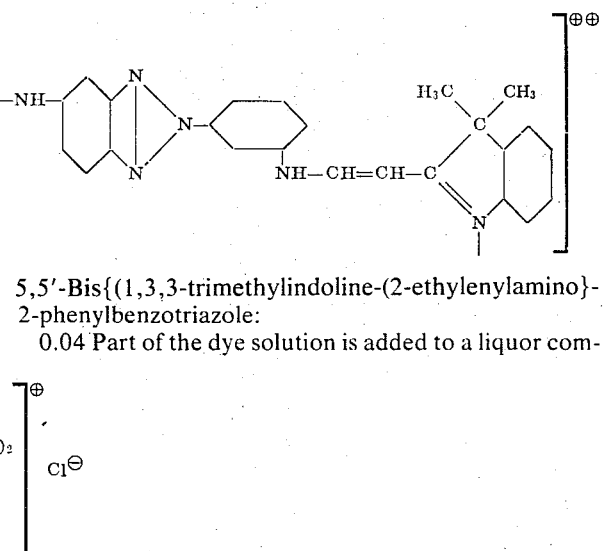

5,5'-Bis{(1,3,3-trimethylindoline-(2-ethylenylamino}-2-phenylbenzotriazole:

0.04 Part of the dye solution is added to a liquor comprising 25 parts of paper-making pulp and 125 parts of water, and the liquor is stirred for 10 minutes, incorporated with 25 parts of a 2 percent rosin liquid and further stirred for additional 5 minutes. Thereafter, 25 parts of a 3 percent aqueous aluminum sulfate solution is added to the pump liquor to make the total amount 1,500 parts. Subsequently, the pulp liquor is subjected to paper-making to obtain a brilliant yellow colored paper having a strong green fluorescence.

Dye bases having the formulas shown below, which are similar in structure to the above-mentioned dye base, can also be prepared according to a process similar to that mentioned above and, when used in the same manner as above, can impart substantially the same effects as above to paper-making cellulose pulp.

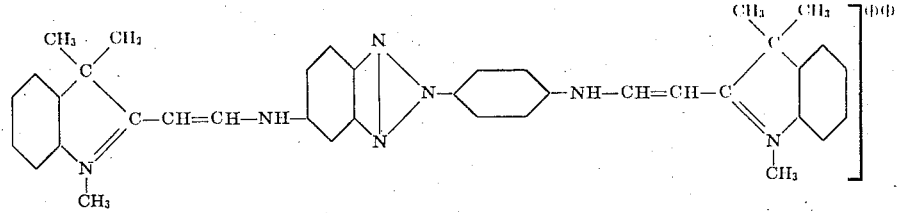

5,4'-Bis{(1,3,3-trimethylindoline-(2))-ethylenyl-amino}-2-phenylbenzotriazole.

EXAMPLE 3

A mixture comprising 24.0 parts of 1-cyanoethyl-3,3-dimethyl-2-methyleneindoline-ω-aldehyde and 24.6 parts of 2-(p-aminophenyl)-3-methyl-5-chlorobenzimidazole is stirred in 10 percent sulfuric acid at room temperature for 8 hours to deposit yellow crystals. The deposited crystals were recovered by filtration, sufficiently washed with water and ammonia water and the dried to obtain 44.0 parts of a dye base having the following formula:

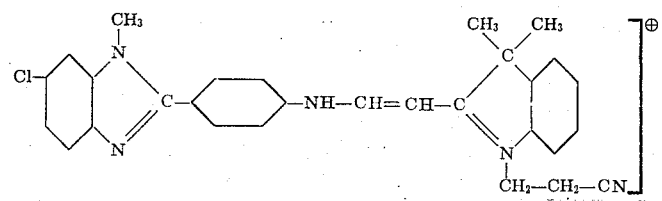

2-[{ p-(1-methyl-6-chlorobenzimidazolyl-(2))-anilino}-ethylenyl]-1-cyanoethyl-3,3-dimethylindoline.

10 Parts of the thus obtained dye base is milled in a ball mill for 12 hours, together with 30 parts of a 30 percent aqueous solution of an acrylic acid amide-methacrylic acid amide copolymer, 5 parts of sodium naphthalenesulfonate and 55 parts of water, to obtain 100 parts of a yellow aqueous paint having a strong green fluorescence. Using this paint, leather and wood are colored according to an ordinary procedure to obtain brilliant yellow color products markedly excellent in light fastness.

EXAMPLE 4

A mixture comprising 20.1 parts of 1,3,3-trimethyl-2-methyleneindoline-ω-aldehyde and 25.5 parts of 2-(p-aminophenyl)-5-methoxy-6-aminobenzotriazole is stirred in 60 parts of 50 percent acetic acid at room temperature for 6 hours, and then ethylene glycol monoethyl ether is added to make the total amount 150 parts. The resulting deep brown color solution contains 43.0 parts of a dye base having the following formula:

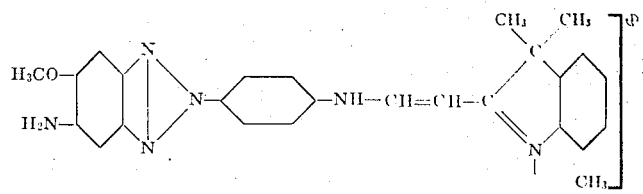

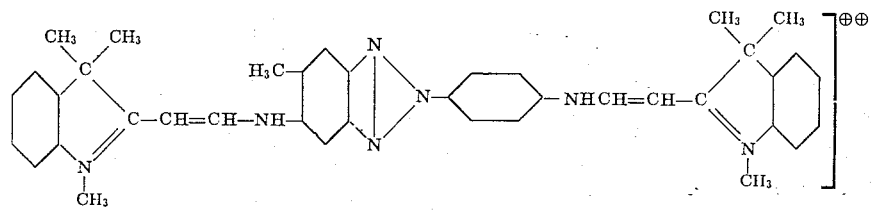

2-[{ p-(5-amino-6-methoxybenzotriazolyl-(2))-anilino}-ethylenyl]-1,3,3 trimethylindoline.

This solution is extremely stable, and does not change even when it is tightly closed in a vessel and allowed to stand at room temperature for 6 months. Using 3 percent of the said solution, an Orlon cloth is dyed in the same manner as in Example 1 to obtain a dyed product having a brilliant yellowish orange color. The thus obtained product is substantially identical in fastness with the dyed product obtained in Example 1.

EXAMPLE 5

A mixture comprising 24.0 parts of 1-cyanoethyl-3,3-dimethyl-2-methyleneindoline-ω-aldehyde and 27.4 parts of 2-(p-aminophenyl)-5-methyl-6-chlorobenzothiazole is stirred in 100 parts of 90 percent acetic acid at 40° to 50°C. for 5 hours, and the resulting liquid is gradually dropped into ammonia water to deposit orange crystals. The deposited crystals are recovered by filtration, sufficiently washed with water, dried and pulverized to obtain 49.2 parts of a dye base powder having the following formula:

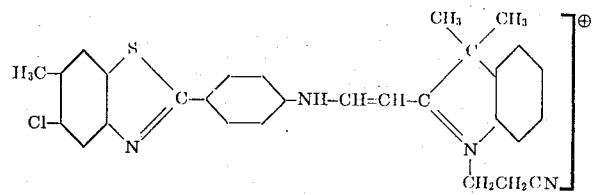

2-[{ p- (5-chloro-6-methylbenzothiazolyl-(2)) - anilino} - ethylenyl] -1- cyanoethyl -3,3 - dimethylindoline.

A mixture comprising a polypropylene resin and 0.05 percent, based on the weight of said resin, of the above-mentioned dye base powder is sufficiently kneaded in a mixing roll at 170°C., and then molded into a desired shape to obtain a brilliant yellow color molded article having a strong green fluorescence.

According to a process identical with or similar to the process mentioned above, colored molded articles of polyester, polystyrene, polyurethane and the like synthetic resins can be obtained.

EXAMPLE 6

40.2 Parts of 1,3,3-trimethyl-2-methyleneindoline-ω-aldehyde, 11.0 parts of 2-(p-aminophenyl)-5-aminobenzotriazole and 12.0 parts of 2-(p-aminophenyl)-5-amino-6-methylbenzotriazole are subjected to condensation reaction in the same manner as in Example 2 to obtain a deep brown solution. This solution contains in a total of 60.0 parts substantially equal amounts of two dye bases having the following formulas:

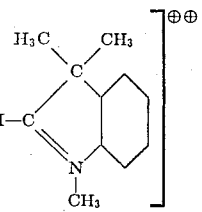

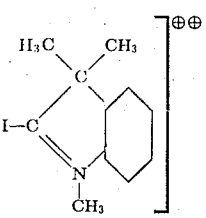

0.01 Part of the said solution and 20 parts of an acetic acid solution containing 0.02 part of a dye base Bismark Brown (C.I. No. 21,000) are homogeneously mixed with each other, and the mixed solution is used to treat paper-making cellulose pulp in the same coloration manner as in Example 2 to obtain a yellowish brown paper product.

What we claim is:

1. A methine compound of the formula

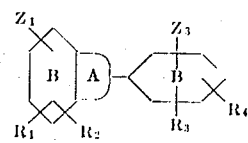

wherein B is a benzene group; A is an oxazole, thiazole, imidazole or triazole ring fused to the group B; $R_1$, $R_2$, $R_3$ and $R_4$, which may be the same or different, are individually a hydrogen or halogen atom, or a phenyl, alkyl, alkoxy, cyano, amino, or dialkylamino group; and either one or two of $Z_1$ and $Z_3$ are indole derivatives of the formula,

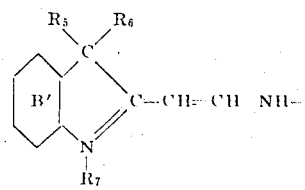

wherein B' is a benzene group; $R_5$ and $R_5$, which may be the same or different, are individually an alkyl group; and $R_7$ is an alkyl or cyanoalkyl group; and wherein the alkyl and alkoxy moieties each have 1 or 2 carbon atoms.

2. A methine compound of the formula,

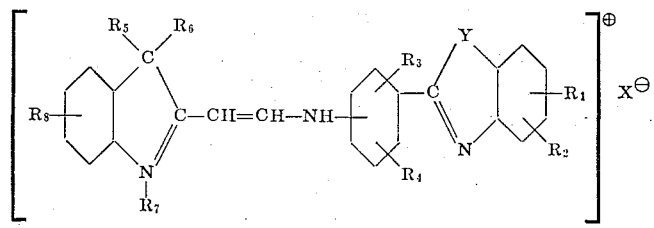

wherein $R_1$, $R_2$, $R_3$ and $R_4$, which may be same or different, are individually a hydrogen or halogen atom, a phenyl, alkyl, alkoxy, cyano, amino or dialkylamino group; $R_5$ and $R_6$, which may be the same or different, are individually an alkyl group; $R_7$ is an alkyl or cyanoalkyl group; $R_8$ is a hydrogen atom or an alkylcarbonyl group; wherein the above-mentioned alkyl and alkoxy moieties each have 1 or 2 carbon atoms; Y is oxygen, sulfur, NH or a group of the formula NR, where R is a lower alkyl group having 1 to 4 atoms; and X is an equivalent of anion.

3. A free base of the compound described in claim 2.

4. A methine compound of the formula,

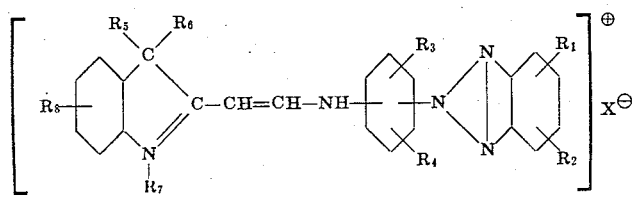

wherein $R_1$, $R_2$, $R_3$ and $R_4$, which may be the same or different, are individually a hydrogen or halogen atom, a phenyl, alkyl, alkoxy, cyano, amino or dialkylamino group; $R_5$ and $R_6$, which may be same or different, are individually an alkyl group; $R_7$ is an alkyl group; $R_8$ is a hydrogen atom or an alkylcarbonyl group; and X is an equivalent of anion and wherein the alkyl and alkoxy moieties each have 1 or 2 carbon atoms.

5. A free base of the compound described in claim 4.

6. A methine compound of the formula, are individually an alkyl group; $R_7$ and $R_{12}$, which may be the same or different, are individually an alkyl or cyanoalkyl group; $R_8$ and $R_9$, which may be the same or different, are individually a hydrogen atom or an alkylcarbonyl group; and X is an equivalent of anion and wherein the alkyl and alkoxy moieties each have 1 or 2 carbon atoms.

7. A free base of the compound described in claim 6.

8.

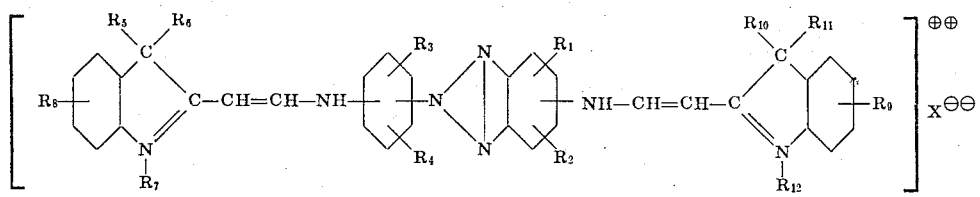

wherein $R_1$, $R_2$, $R_3$ and $R_4$, which may be the same or different, are individually a hydrogen or halogen atom, a phenyl, alkoxy, cyano, amino or dialkylamino group; $R_5$, $R_6$, $R_{10}$ and $R_{11}$, which may be the same or different, where X is an equivalent of anion.

9.

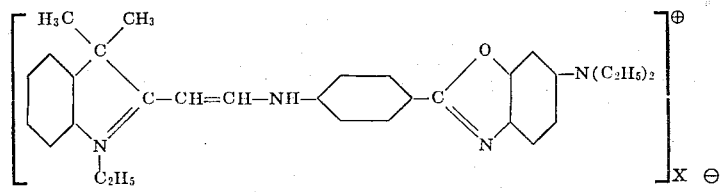

where X is an equivalent of anion.

10.

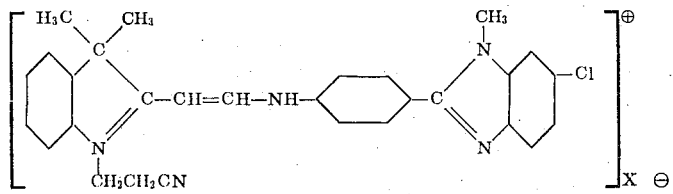

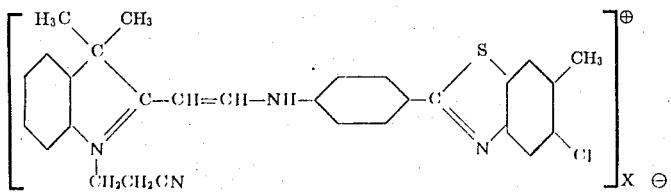

where X is an equivalent of anion.
11.
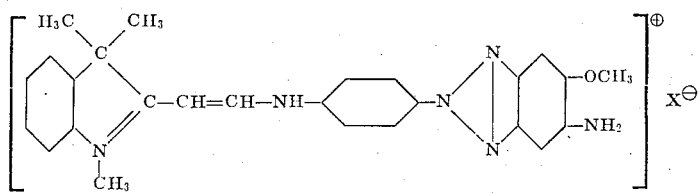
where X is an equivalent of anion.
12.
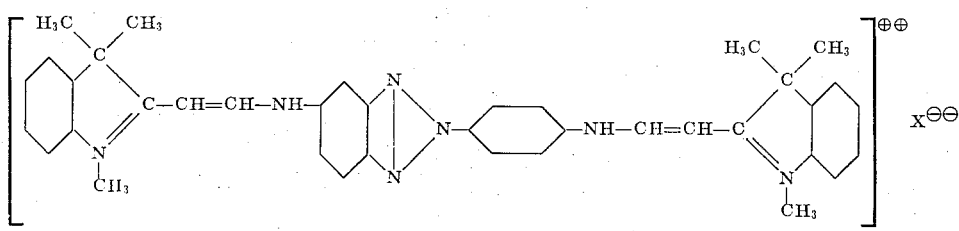
where X is an equivalent of anion.
13.
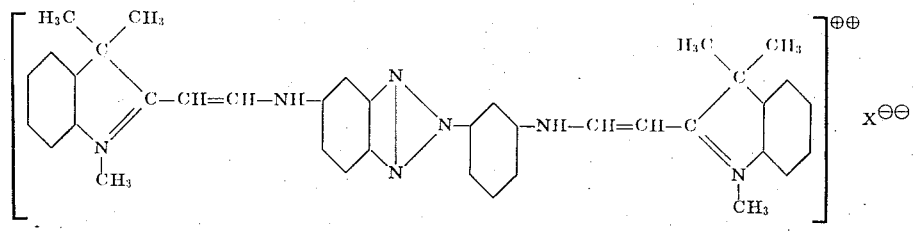
where X is an equivalent of anion.
* * * * *